(12) United States Patent
Huttenlocher

(10) Patent No.: US 9,162,608 B2
(45) Date of Patent: Oct. 20, 2015

(54) COVERING ELEMENT

(71) Applicant: Decoma GmbH, Sulzbach (DE)

(72) Inventor: Marc Huttenlocher, Nuertingen (DE)

(73) Assignee: Decoma (Germany) GmbH, Sulzbach (DE)

( * ) Notice: Subject to any disclaimer, the term of this patent is extended or adjusted under 35 U.S.C. 154(b) by 0 days.

(21) Appl. No.: 14/363,843

(22) PCT Filed: Nov. 19, 2012

(86) PCT No.: PCT/DE2012/200075
§ 371 (c)(1),
(2) Date: Jun. 9, 2014

(87) PCT Pub. No.: WO2013/083126
PCT Pub. Date: Jun. 13, 2013

(65) Prior Publication Data
US 2014/0347871 A1  Nov. 27, 2014

(30) Foreign Application Priority Data
Dec. 7, 2011  (DE) .......................... 10 2011 120 363

(51) Int. Cl.
*B60Q 1/00* (2006.01)
*B60Q 1/26* (2006.01)
*F21S 8/10* (2006.01)

(52) U.S. Cl.
CPC ............ *B60Q 1/0017* (2013.01); *B60Q 1/2653* (2013.01); *B60Q 1/2661* (2013.01); *F21S 48/30* (2013.01)

(58) Field of Classification Search
CPC ......... F02B 3/06; F02B 75/04; B60Q 1/2653; B60Q 1/0017

USPC ......................................................... 362/459
See application file for complete search history.

(56) References Cited

U.S. PATENT DOCUMENTS

| | | | |
|---|---|---|---|
| 2004/0160782 A1 | 8/2004 | Zimmerman | |
| 2005/0094409 A1 | 5/2005 | Elwell | |
| 2007/0058382 A1 | 3/2007 | Lan | |
| 2007/0095403 A1 | 5/2007 | Su | |
| 2008/0094409 A1 | 4/2008 | Koguchi et al. | |

FOREIGN PATENT DOCUMENTS

| | | |
|---|---|---|
| DE | 102009024783 A1 | 12/2010 |
| DE | 102009055427 A1 | 7/2011 |
| EP | 1577162 A2 | 9/2005 |
| EP | 1914118 A2 | 4/2008 |
| EP | 1914119 A2 | 4/2008 |
| JP | H0535482 U | 5/1993 |
| JP | 7201209 A | 8/1995 |
| JP | 2001105966 A | 4/2001 |

OTHER PUBLICATIONS

International Preliminary Report on Patentability dated Jun. 10, 2014 from International Patent Application No. PCT/DE2012/200075.

*Primary Examiner* — Vip Patel
(74) *Attorney, Agent, or Firm* — Jordan IP Law, LLC; Todd A. Vaughn

(57) ABSTRACT

A covering element for an air inlet opening and/or air outlet opening in a motor vehicle body. A covering element lamella or a design element spans the opening and has a translucent surface in the direction towards the outside of the vehicle at least in a sub-region or the sub-region is designed to be translucent such that light from a light source which lies behind the sub-region and which is arranged in the interior of the lamella or the design element can exit.

20 Claims, 6 Drawing Sheets

COVERING ELEMENT

CROSS-REFERENCE TO RELATED APPLICATIONS

The present application is a National Stage Application of PCT International Application No. PCT/DE2012/200075 (filed on Nov. 19, 2012), under 35 U.S.C. §371, which claims priority to German Patent Application No. DE 10 2011 120 363.3 (filed on Dec. 7, 2011), which are each hereby incorporated by reference in their respective entireties.

TECHNICAL FIELD

Embodiments relate to a covering element for an air inlet opening and/or air outlet opening in a motor vehicle body. The covering element includes a lamella or a design element which spans the opening of the air inlet and/or air outlet in a direction of the outside surface of the vehicle at least in a part region. A light-pervious top surface or the part region is developed so as to be light-pervious such that light from a light source located spatially aft and is arranged in the interior of the lamella or of the design element, is able to emerge.

BACKGROUND

German Patent Publication No. DE 10 2007 018 678 A1 makes known a covering element in the form of a radiator grille for a motor vehicle, consisting of lamellae which extend substantially parallel to one another, at least one of the lamellae including a light device or is realized as a light device. The light devices can provide the beam by means of optical waveguides or can also be realized directly as self-illuminating elements, e.g., in the form of a luminous film. LEDs are also provided as light sources.

Illumination of an opening which serves for air inlet and/or air outlet in a vehicle body is described in German Patent Publication No. DE 103 37 617 B4. The elements surrounding the opening are realized at least in portions as light sources. Light-conducting elements are also provided.

SUMMARY

Embodiments relate to an enhanced design of a radiator grille with an incorporated illuminating device, with varied development to be possible, in particular.

In accordance with embodiments, provided is a covering element for an air inlet opening and/or air outlet opening in a motor vehicle body. The covering element includes a lamella or a design element which spans the opening of the air inlet and/or air outlet in a direction of the outside surface of the vehicle at least in a part region. A light-pervious top surface or the part region is developed so as to be light-pervious such that light from a light source located spatially aft and is arranged in the interior of the lamella or of the design element, is able to emerge.

In accordance with embodiments, a covering element for an air inlet opening and/or air outlet opening in a motor vehicle body, preferably in the form of a radiator grille, and comprises the following features: a lamellae or the design elements spanning the opening, in a direction of the outside surface of the vehicle at least in a part region; a light-pervious top surface such that light from a light source, which is located behind the top surface and is arranged in the interior of the design element, is able to emerge in the direction of the outside.

The light source is preferably an LED which is arranged on a carrier element which is arranged behind the lamella or the design element. The carrier element, which is attached on the lamella or the design element from behind, also includes, aside from the light source, the LED, the electric supply lines for this purpose and preferably bestows the provided stability on the lamella, the design element.

Thus, it is in particular possible to equip the covering element, the radiator grille without any light elements, a carrying element without light sources then being attached from behind on the lamellae, the design element. If the covering element is to be developed with light effects, a carrier element with light elements is thus used. Different degrees of equipment can thus be realized in a simple manner.

The covering element in accordance with embodiments may comprise linearly-formed light emission regions which are irradiated from behind by light sources, LEDs, which rest on the carrier element and are arranged in rows. It is also possible to assign to the linearly developed light emission region one or two light sources which couple into one light waveguide and said light waveguide illuminates said light emission region over the length of the same from behind. Thus, very fine and uniformly shining lines are created.

The design element, the lamella can be connected to the carrier element by means of an adhesive connection. Said adhesive connection then also takes over the sealing function such that the interior of the lamella, of the design element with the light source is protected against water or contamination. This is in particular necessary and sensible whenever the light emission region is not an opening but is realized in the form of transparent plastics material or as a region with a reduced wall thickness, as a result the interior of the lamella, of the design element therefore forms an encapsulated interior space. The electric supply line for the light source which is arranged in the interior is then guided through the seal, the adhesive connection.

The connection between the lamella, design element and the carrier element can also be effected by means of welding (plastics material welding), it is also possible to use clips and/or rivet connections. In said cases—depending on the degree of sealing required—additional sealing measures, sealing means, which seal the named parts in particular in the region of the cable or line lead-through, are necessary.

Finally, a combined sealing and conducting device can be provided, that is an element which is placed between the design element and the carrier element and is realized as a strip or a mat in which the electric lines for the light source or light sources are incorporated. It is also possible for the light source or light sources to be arranged already on said element. During assembly, said element is placed onto the carrier element and the molded part of the lamella, of the design element is then placed on top of said element and said parts are then connected.

DRAWINGS

In addition, exemplary embodiments of the invention are explained by way of the drawings.

DESCRIPTION

Figure 1:
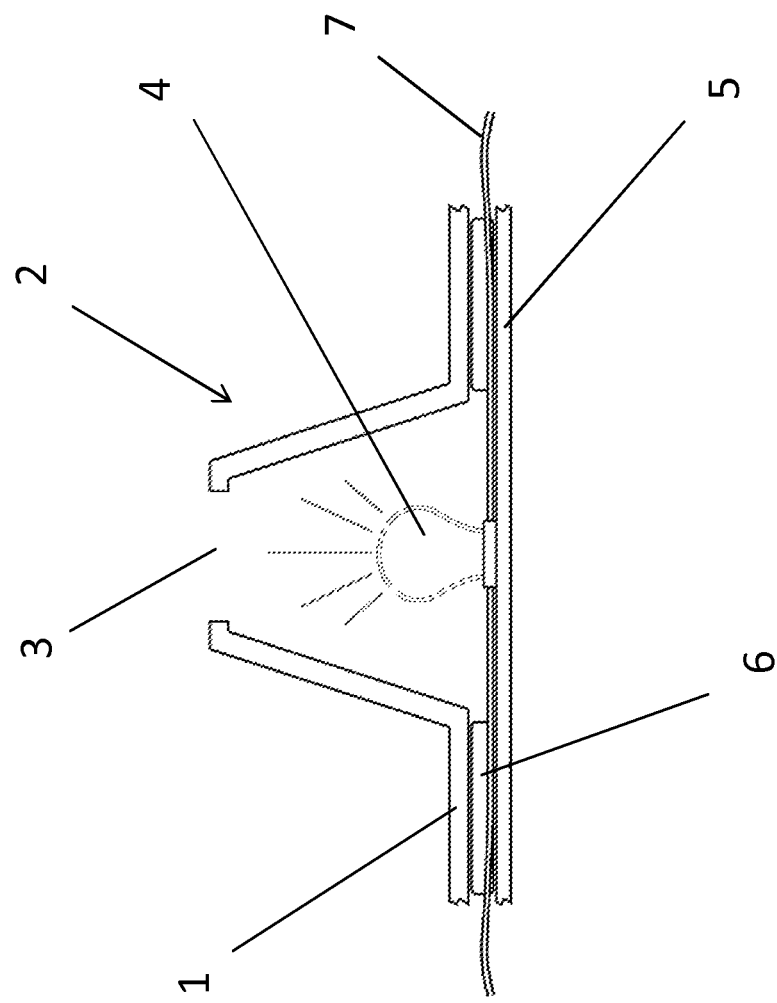
FIG. 1 illustrates a sectional view of a design element, in accordance with embodiments.

FIG. 1 illustrates a design element 2 in the form of a truncated-cone-shaped elevation which rests on a radiator grille face 1 of a radiator grille which is not shown in any more detail. The radiator grille face 1 comprises air vent openings (not illustrated) in a provided structure and size distribution over its face. Design elements 2 are also arranged on the radiator grille face in a provided form and/or size and/or distribution.

The design element 2 represented here in section is carried out as a plastics material molded part and is realized as a structure which is raised toward the outside surface of the vehicle body. The flat top surface of the design element 2 comprises an opening 3 as a light-pervious region, through which light from a light source 4 which is arranged in the interior of the design element 2 is able to emerge. The light source 4 is represented here in a purely symbolic manner, and may preferably be an LED.

The light source 4, the illuminating means is arranged on a carrier element 5 which is attached from behind on the radiator grille face 1 which supports the design element 2 and is preferably connected thereto by means of adhesive connections 6. The carrier element is able to span the entire face of the opening which is to be covered by the radiator grille, the radiator grille face 1 and comprises openings which are developed in a corresponding manner to the air vent openings of the radiator grille face 1 such that the bond formed in this manner between the radiator grille face 1 and the carrier element 5 enables the provided air venting and comprises the required stability.

Electric lines 7, which are realized as cabling or preferably as lines that are applied directly on the carrier element, are provided aside from the light source 4 arranged on the carrier element 5. The adhesive connections 6 which connect the radiator grille face 1 to the carrier element 5 also bring about a sealing of the interior of the design element 2 and a correspondingly tight line lead-through.

Figure 2:
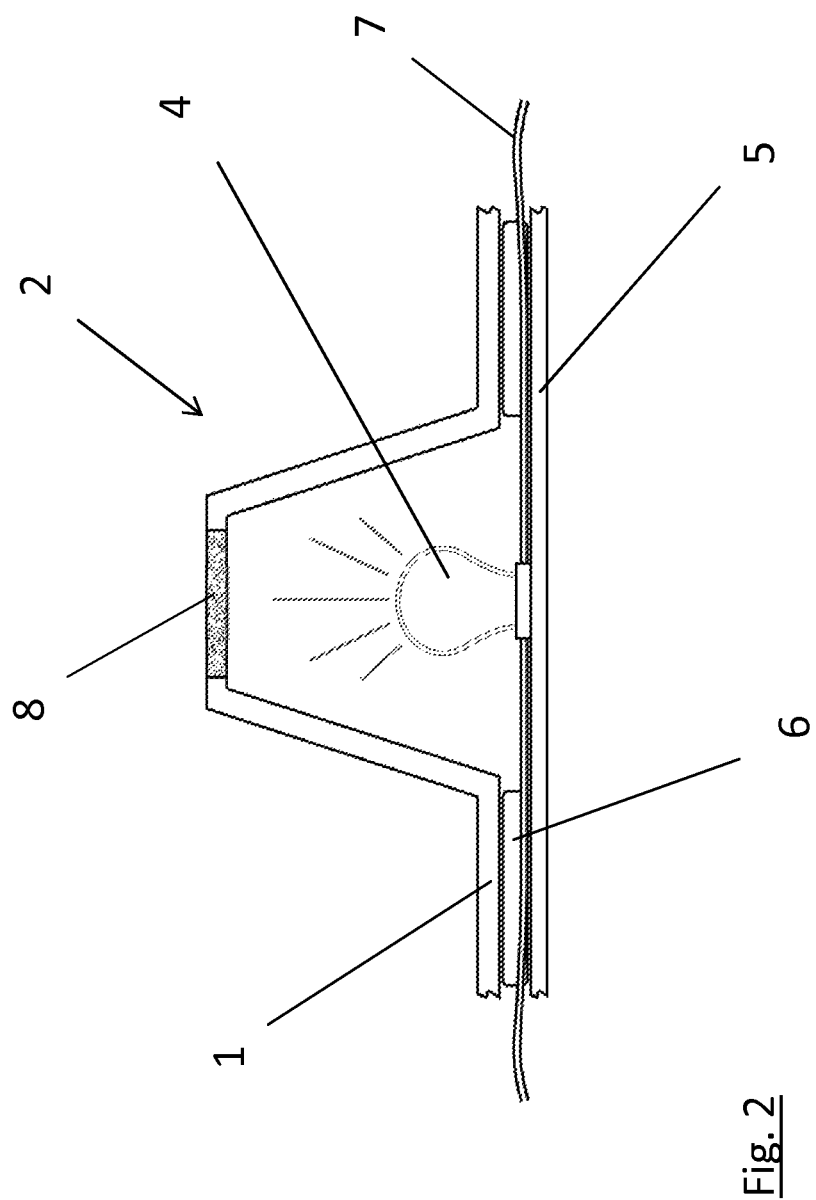
FIG. 2 illustrates a sectional view of a design element, in accordance with embodiments.

As illustrated in FIG. 2, the light-pervious region is realized on the top surface of the design element 2 in the form of a transparent layer 8 in the manner of a disk which is inserted into an opening of the top surface or which fills out said top surface. The transparent layer 8 can be generated during a special injection process with the layer strength that is necessary to generate a provided emission of light. As a result of the choice of material as well as a structuring on one or both top surfaces of the transparent layer 8 (bottom and/or top surface) it is also possible to influence the distribution of light, the direction of the beam, the characteristics of the beam. The choice of material and/or surface structuring can be such that the light-pervious region generated in this manner is not able to be recognized or a provided optical impression is produced in non-lit operation.

Figure 3:
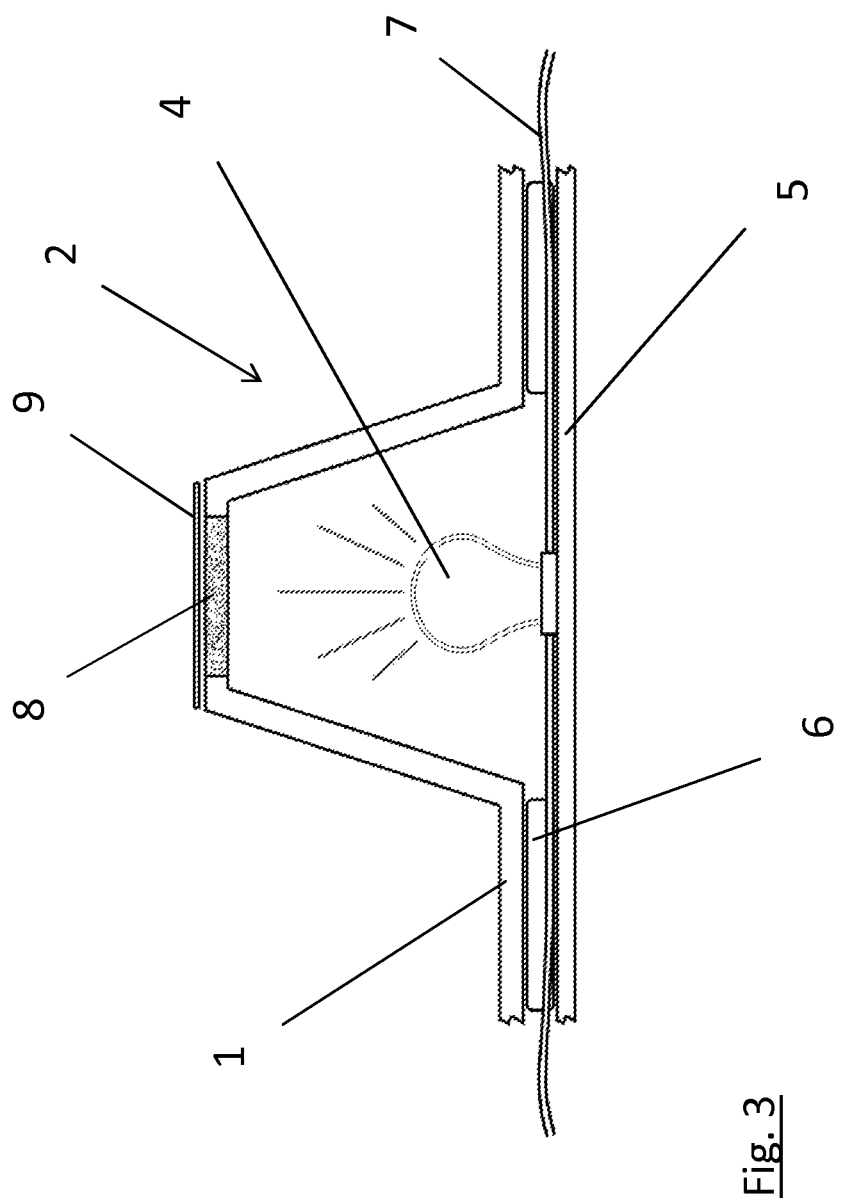
FIG. 3 illustrates a sectional view of a design element, in accordance with embodiments.

As illustrated in FIG. 3, provided above the light-pervious, transparent layer 8 is a cover layer 9 as a decorative layer which is also developed so as to be light-pervious and creates the provided optical impression during non-lit operation.

Figure 4:
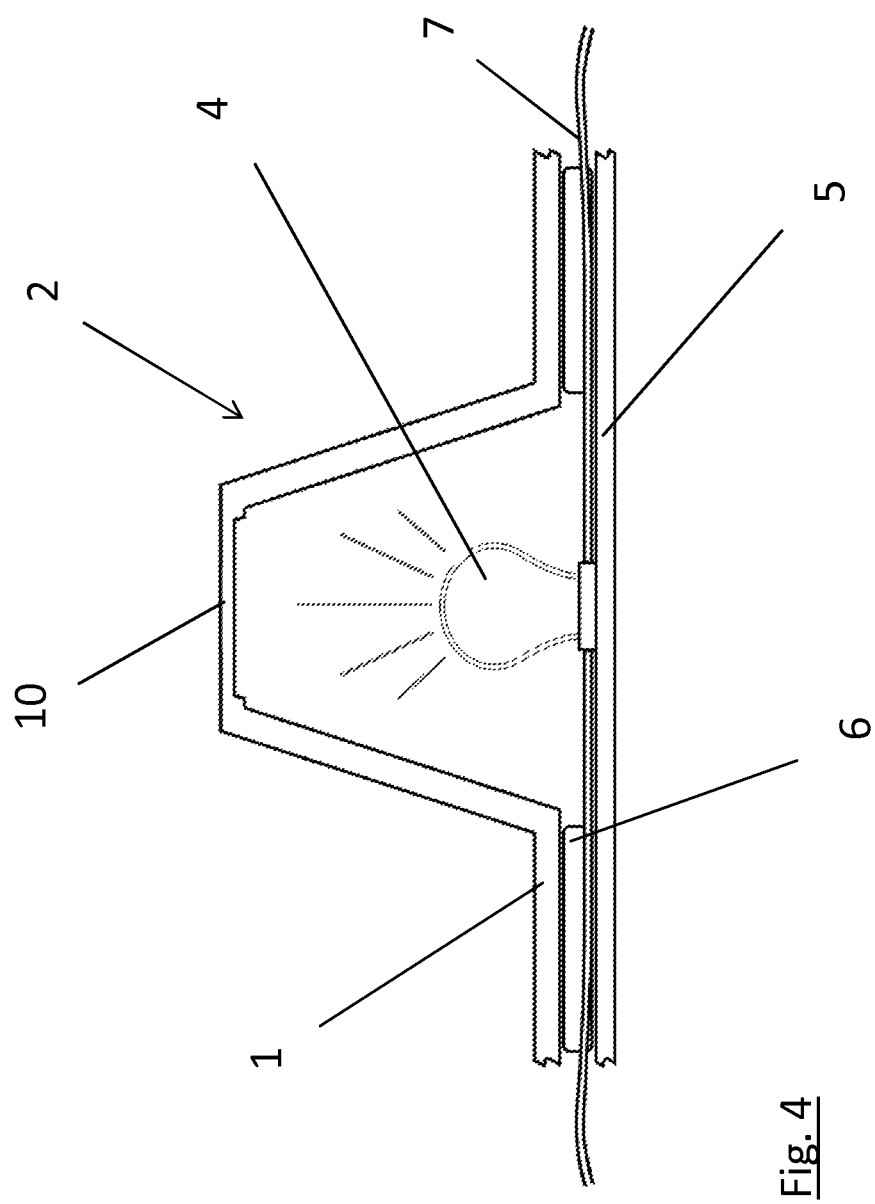
FIG. 4 illustrates a sectional view of a design element, in accordance with embodiments.

As illustrated in FIG. 4, the light-pervious region is created on the top surface of the design element 2 as a result of a material thinning 10, that is a reduction in the layer thickness. This can be effected as a result of a production method that is based on the principle of physical vapor deposition processes (PVD). The reduction in the layer thickness is carried out in this case in dependence on the plastics material in such a manner, that is the layer thickness is reduced in such a manner that the desired light transmission is able to be achieved. The light-pervious region is preferably such that it is not visible in non-lit operation, the surface of the design element 2 therefore appears solid.

Figure 5:
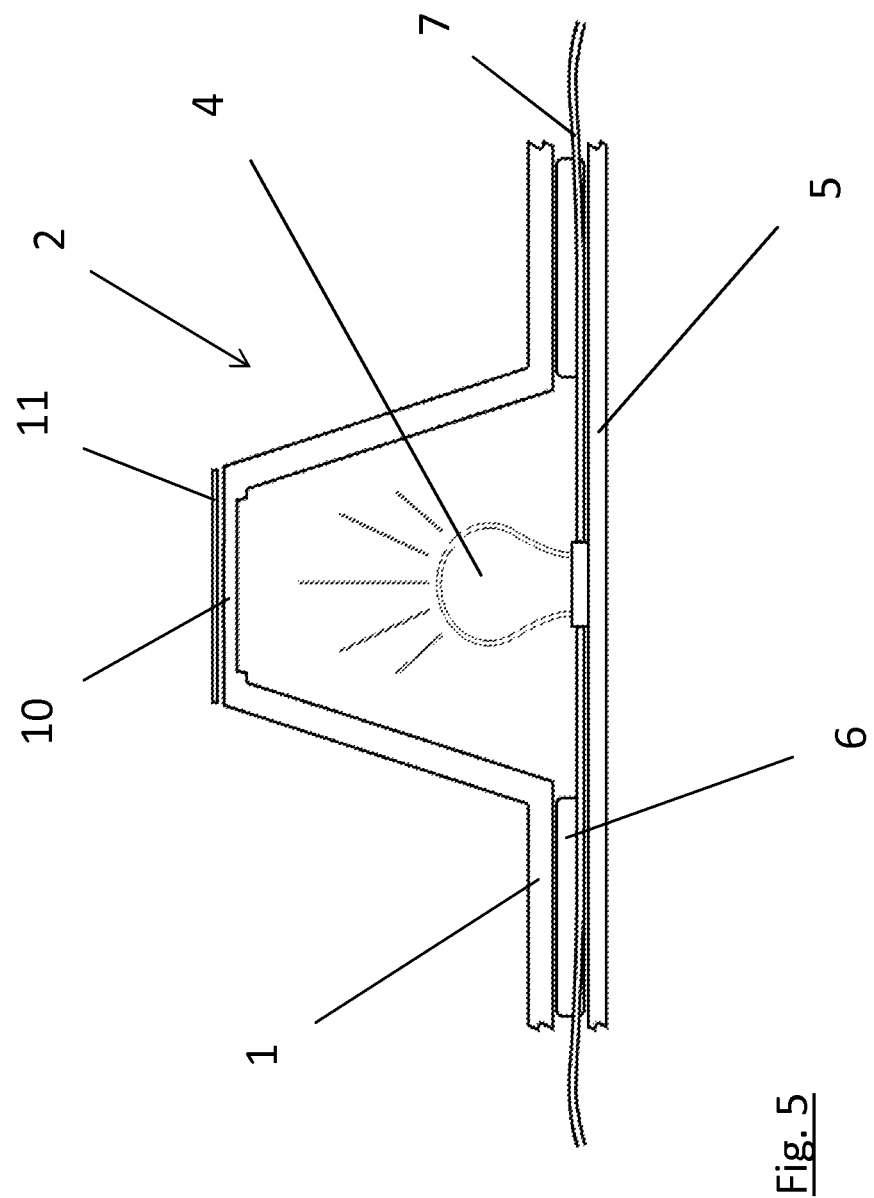
FIG. 5 illustrates a sectional view of a design element, in accordance with embodiments.

As illustrated in FIG. 5, as in the case of the exemplary embodiment explained in connection with FIG. 3, the material thinning 10 in the design element 2 can be covered additionally with a translucent cover layer 11 as a decorative layer in the form of a film.

Figure 6:
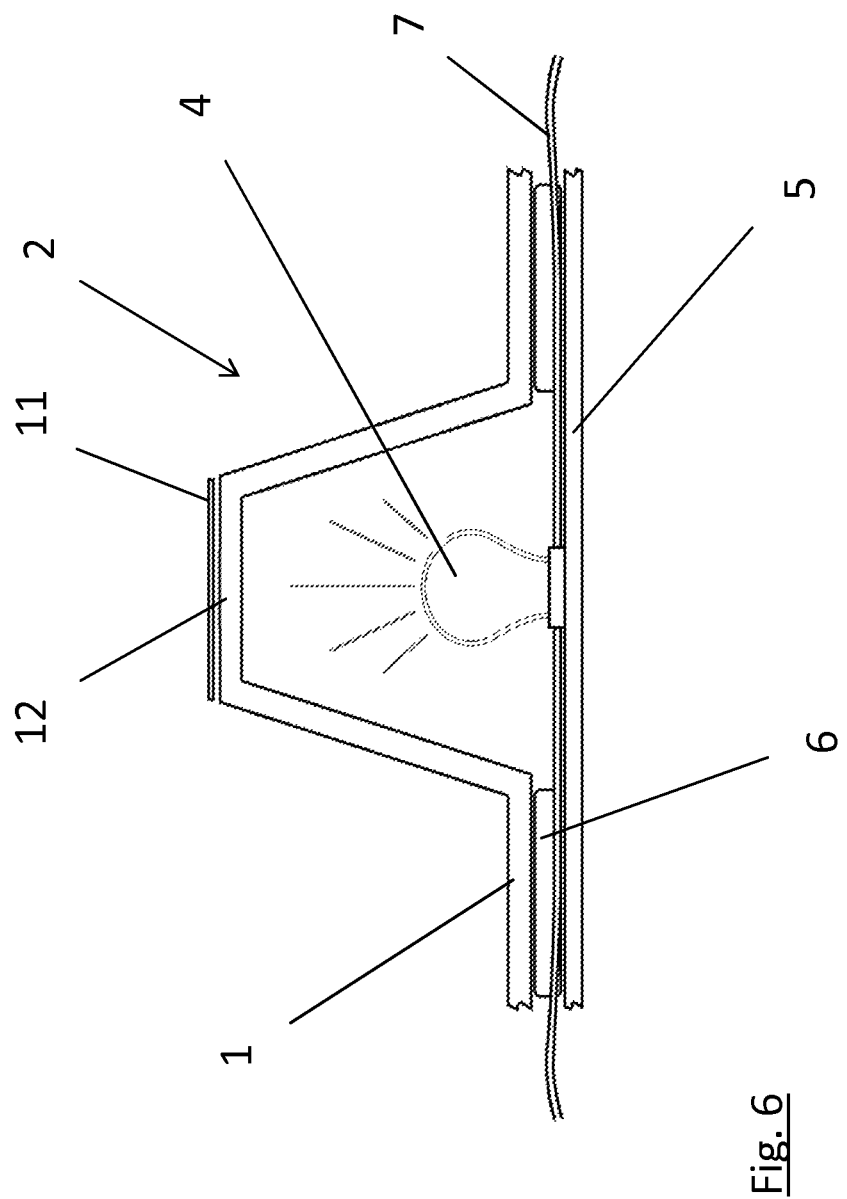
FIG. 6 illustrates a sectional view of a design element, in accordance with embodiments.

As illustrated in FIG. 6, the material of the design element 2 is developed in a light-pervious manner in the region provided for the emission of light, in this case on the top surface 12, which is managed as a result of a choice of suitable material in conjunction with the thickness of the wall. A translucent cover layer is also provided in this case as a decorative layer.

LIST OF REFERENCE NUMERALS

1 Radiator grille face, radiator grille element, lamella
2 Design element
3 Opening (emission of light)
4 Illuminating means, light source, LED
5 Carrier element
6 Adhesive connection, seal
7 Line
8 Transparent layer, disk
9 Cover layer, decorative layer, film
10 Material thinning, reduction in layer thickness
11 Cover layer, decorative layer, film
12 Top surface, transparent region (emission of light)

What is claimed is:

1. A covering element for a motor vehicle, the covering element comprising:
    a lamella to span an air inlet opening and/or an air outlet opening in a direction of an outside surface of the motor vehicle, the lamella having an opening at a top surface which enables the emission of light from a light source arranged in an interior space defined by the lamella.

2. The covering element of claim 1, further comprising a light-pervious disk to be received in the lamella opening.

3. The covering element of claim 2, further comprising a light-pervious cover layer to be arranged over the light-pervious disk.

4. The covering element of claim 3, wherein the light-pervious cover layer comprises a decorative film.

5. The covering element of claim 3, wherein, during an inactive state of the light source, the light-pervious disk and the light-pervious cover layer are not able to be recognized as light-pervious.

6. The covering element of claim 1, further comprising a carrier upon which the lamella and the light source are arranged.

7. The covering element of claim 6, wherein the carrier comprises lines to be electrically connected to the light source.

8. The covering element of claim 6, further comprising a seal arranged between the carrier and the lamella.

9. The covering element of claim 8, wherein the seal includes electrical connections for the light source.

10. A covering element for a motor vehicle, the covering element comprising:
    a lamella to span an air inlet opening and/or an air outlet opening in a direction of an outside surface of the motor vehicle, the lamella including in at least one region thereof a light-pervious surface which enables the emission of light from a light source arranged in an interior space defined by the lamella.

11. The covering element of claim 10, wherein the light-pervious surface has a reduction in the thickness.

12. The covering element of claim 10, further comprising a light-pervious cover layer to be arranged over the light-pervious surface.

13. The covering element of claim 12, wherein the light-pervious cover layer comprises a decorative film.

14. The covering element of claim 12, wherein, during an inactive state of the light source, the light-pervious surface and the light-pervious cover layer are not able to be recognized as light-pervious.

15. The covering element of claim 10, further comprising a carrier upon which the lamella and the light source are arranged.

16. The covering element of claim 15, wherein the carrier comprises lines to be electrically connected to the light source.

17. The covering element of claim 15, further comprising a seal arranged between the carrier and the lamella.

18. The covering element of claim 17, wherein the seal includes electrical connections for the light source.

19. A covering element for a motor vehicle, the covering element comprising:
a lamella to span an air inlet opening and/or an air outlet opening in a direction of an outside surface of the motor vehicle, the lamella including in at least one region thereof a transparent, light-pervious surface which enables the emission of light from a light source arranged in an interior space defined by the lamella.

20. The covering element of claim 19, further comprising:
a light-pervious cover layer to be arranged over the transparent, light-pervious surface;
a carrier upon which the lamella and the light source are arranged; and
a seal arranged between the carrier and the lamella.

* * * * *